June 15, 1937.                L. ROSENVOLD                2,084,049
                    REEL FOR GRAIN HARVESTING MACHINES
                    Filed Sept. 11, 1936        3 Sheets-Sheet 1
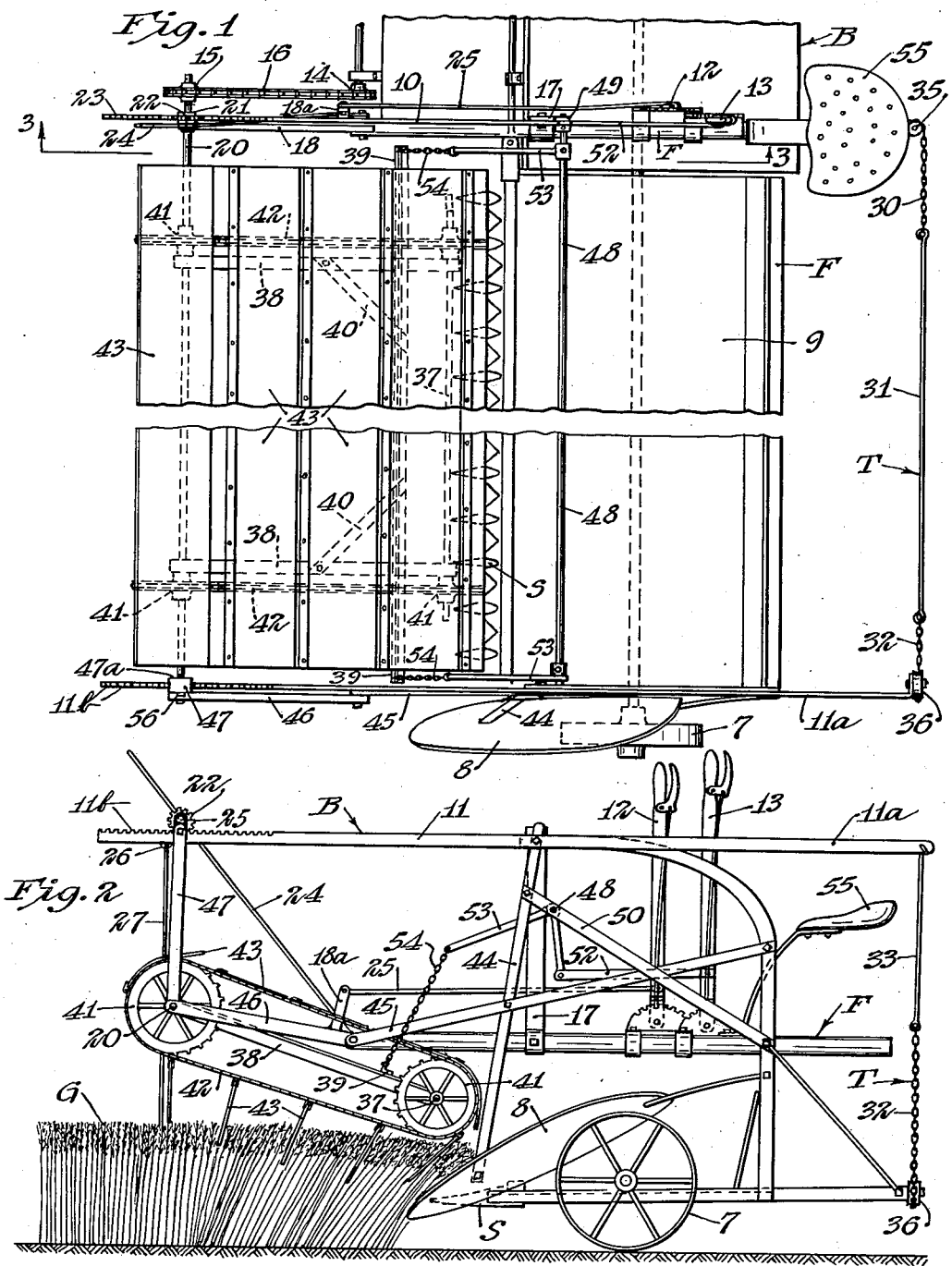
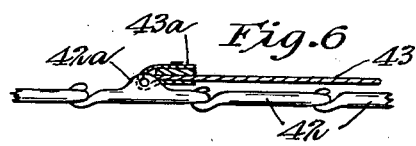
Inventor
Leo Rosenvold
By Williamson & Williamson
Attorneys

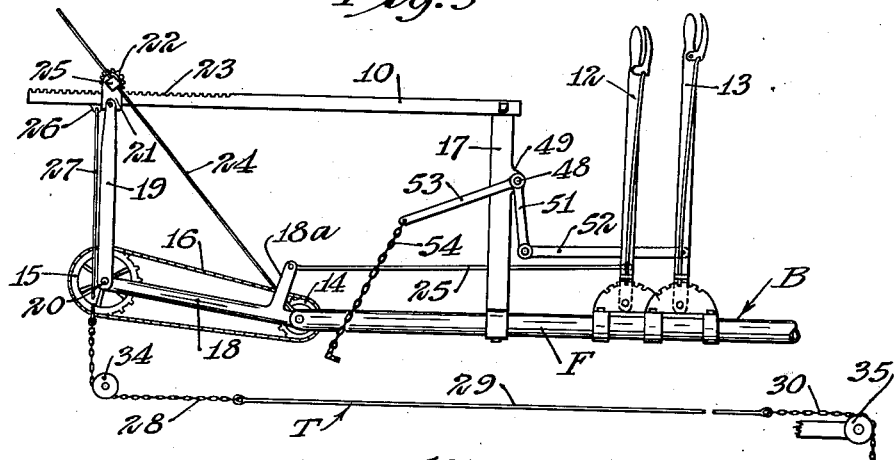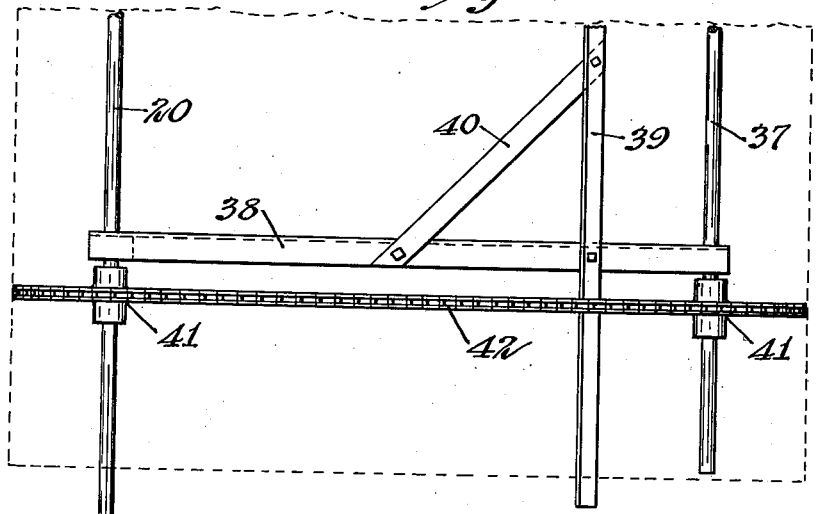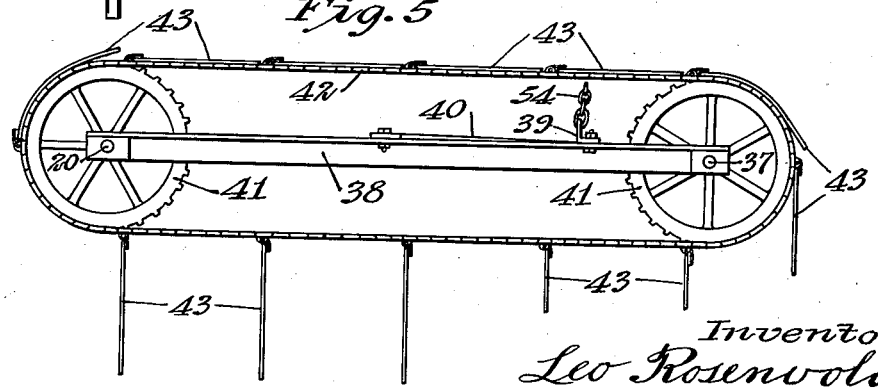

June 15, 1937.  L. ROSENVOLD  2,084,049
REEL FOR GRAIN HARVESTING MACHINES
Filed Sept. 11, 1936  3 Sheets-Sheet 3
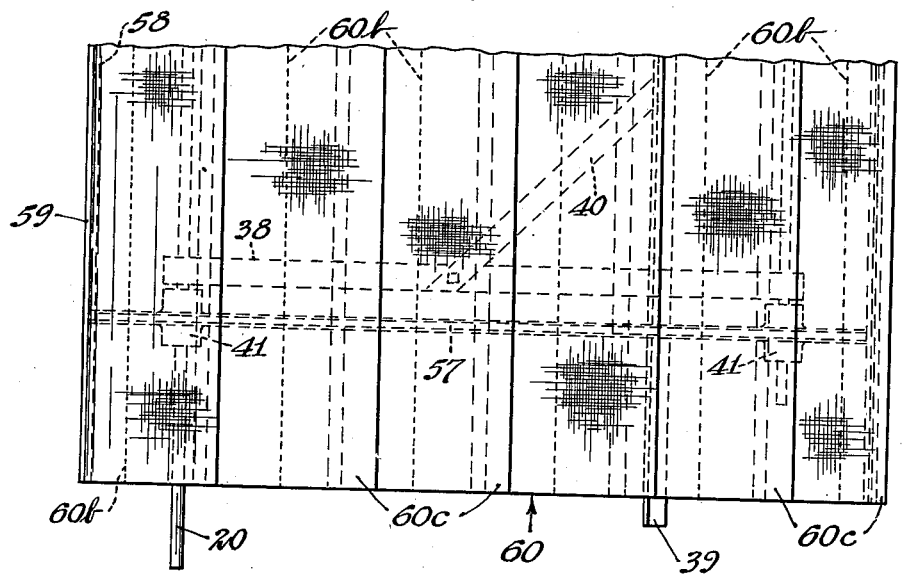
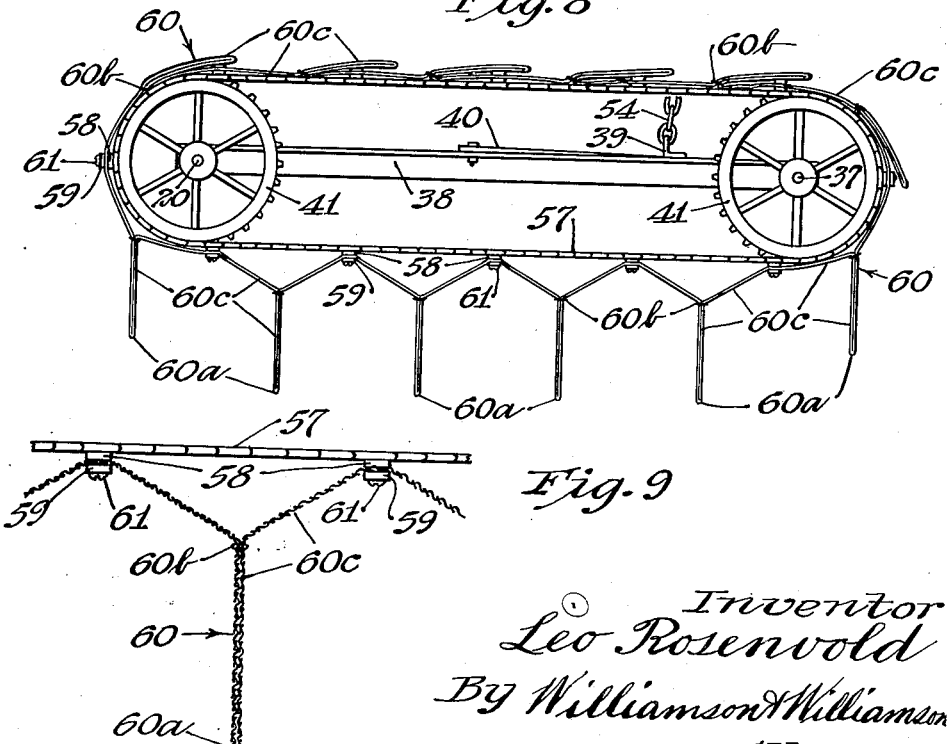

Patented June 15, 1937

2,084,049

UNITED STATES PATENT OFFICE 2,084,049

REEL FOR GRAIN HARVESTING MACHINES

Leo Rosenvold, Wildrose, N. Dak.

Application September 11, 1936, Serial No. 100,254

14 Claims. (Cl. 56—219)

My invention relates to agricultural machinery and particularly to reels for grain harvesting machines.

In conventional grain binders and other grain harvesting machines the reel usually includes rigid spokes carrying rigid slats or paddlles arranged in circumferentially spaced relation. With such reels, particularly when the machine is propelled at a fairly high rate of speed, as when towed by a tractor, constant attention is required to adjust the level of the reel to suit the contour of the ground over which the machine is traveling. Failure to adjust the level of the reel to meet all conditions of ground contour and the encountering of obstructions such as rocks by the reel usually result in damage to the reel. Also, with the lowermost paddle of the reel moving rearwardly over the sickle bar and traveling rearwardly therebeyond for a considerable distance before leaving contact with the grain, a considerable quantity of grain is thrown too far rearwardly and is lost or wasted instead of being deposited upon the conveyor belt. A further disadvantage of the conventional reel is that it knocks the heads off of stalks of grain and thus causes further loss or waste.

A general object of my invention is to provide a superior grain engaging reel which need not be frequently or particularly accurately adjusted in level to meet ground contour conditions, which will not be damaged by striking of the ground or obstructions thereby and which will cause only a greatly reduced loss or waste of grain.

A more specific object is to provide a reel wherein the grain engaging portions thereof are of a flexible and yielding nature so as not to be readily damaged by striking the ground or obstructions.

Another object is to provide a reel wherein the grain engaging elements thereof travel rearwardly toward the sickle bar in substantially a straight line and then travel upwardly substantially immediately after passing over the sickle bar.

A further object is to provide such a reel of simple, compact, light and inexpensive construction.

These and other objects and advantages of the invention will be more fully set forth in the following description made in connection with the accompanying drawings, in which like reference characters refer to similar parts throughout the several views, and in which:—

Fig. 1 is a top view of a portion of an otherwise conventional binder wherein an embodiment of my invention is incorporated, Fig. 2 is a side view, Fig. 3 is a simplified vertical sectional view taken along the line 3—3 of Fig. 1 as indicated by the arrows, Fig. 4 is a partial top view with certain parts removed, Fig. 5 is an end view of the reel proper and a portion of supporting means therefor shown to enlarged scale, Fig. 6 is a view of certain details of the reel of Fig. 5 shown to further enlarged scale, Fig. 7 is a broken-away partial top view of another form of my grain handling reel, Fig. 8 is a side view, and Fig. 9 is a detail view.

Referring to the drawings, an embodiment of my invention is shown incorporated in an otherwise conventional grain binder B and mechanically connected to certain parts thereof so as to be driven and adjustively supported therefrom. The binder B is complete, as ordinarily constructed, except for omission of certain parts including principally the conventional reel and reel shaft and certain small parts associated therewith. The binder B includes the usual frame F, main wheel (not shown) sickle and conveyor supporting wheel 7, divider 8, sickle bar S, conveyor 9, bundling and binding mechanism (not shown), reel supporting arms 10 and 11, control levers 12 and 13, reel driving sprockets 14 and 15 and sprocket chain 16, and means connecting the lever 12 to the reel supporting arms whereby the lever 12 may be operated to raise and lower the arms 10 and 11 simultaneously.

The reel supporting arm 10 is pivotally connected at its rearward end to an upstanding member 17 mounted on the binder frame F so as to be swingable upwardly and downwardly. Near its forward end the arm 10 is connected to the frame F by a toggle-like combination of a lower bar 18 and an upper bar 19. At its lower and rearward end, the lower bar 18 is pivotally connected to the frame F so as to be swingable upwardly and downwardly. At its forward and upper end the lower bar 18 is pivotally connected to the lower end of the upper bar 19 by means of a shaft 20, to be further described, so as to form the knee joint of the toggle-like combination. At the upper end thereof, the upper toggle bar 19 is pivotally connected to a member 21 which is slidable longitudinally of the reel supporting arm 10 and carries a rotatably mounted gear 22 meshed in a rack 23 formed in the upper side of the arm 10. An elongated member 24 is pivotally connected at its lower end to the frame F to provide for forward and rearward swinging movement and, in its medial portion, is slidably extended through an apertured element 25 rockably connected to the slidable member 21.

A sprocket 14, shown in Fig. 3 and driven in a counterclockwise direction (as viewed in Fig. 3) from the binder main wheel (not shown) in a conventional manner, is connected through a sprocket chain 16 to a sprocket 15 mounted on the shaft 20 previously referred to.

An upwardly projecting element 18a is connected through a link rod 25 to the control lever 12 whereby forward and rearward movements of the lever 12 will cause respective lowering and raising of the lower toggle bar 18 to lower and raise the shaft 20 and, through the upper toggle bar 19, to raise and lower the reel supporting arm 10. The remaining reel supporting arm 11 has a rearwardly extending portion 11a so as to comprise therewith a walking beam. To provide for raising and lowering of the reel supporting arm 11 corresponding to and simultaneously with respective upward and downward movement of the reel supporting arm 10, a suitable tension member T extends downwardly from an apertured lug 26, best seen in Fig. 3, on the outer portion of the reel supporting arm 10, over suitable guide means, and upwardly to the rear end of the rearward extension 11a of the reel supporting arm 11, the respective ends of the tension member T, of course, being connected respectively to the lug 26 and the free end of the extension 11a whereby upward movement of the reel carrying arm 10 will, through the tension member T, pull the extension 11a downwardly and hence cause corresponding upward movement of the reel carrying arm 11. The tension member T consists of a rod 27, chain 28, rod 29, chain 30, rod 31, chain 32 and rod 33 connected one to the other in end to end relation as shown in Figs. 3, 1 and 2. The chain portions 28, 30 and 32 of the tension member T are trained over respective pulleys 34, 35 and 36 of which the axes are respectively disposed transversely of the binder B, vertically, and longitudinally of the binder B. The pulleys 34 and 36 are located substantially below the lug 26 and the free end of the extension 11a respectively and the pulley 35 is located substantially at the intersection of horizontal lines through the pulleys 34 and 36 normal to the respective axes thereof. The pulleys 34, 35 and 36 are, of course, rotatively mounted on suitable portions of the binder frame F.

All of the above described structure is of conventional design and will be found on many binders now in use.

My reel consists essentially of one or more endless elements traveling in parallel endless respective paths disposed in respective vertical planes extending substantially in the normal direction of travel of the binder, these elements carrying a circumferentially extending series of spaced transversely extending flaps projecting from the outer side thereof and being adapted for movement in such direction as to propel the lowermost ones of the flaps thereon in a direction opposite to the normal direction of travel of the binder. Preferably the flaps are made of relatively flexible material and are so connected to the flexible elements as to be swingable forwardly and rearwardly relative thereto.

The form of my reel illustrated in the drawings includes a front reel shaft 20, which is the shaft 20 previously referred to as pivotally joining toggle members 18 and 19 together, and a rear reel shaft 37 disposed parallel to each other and transversely of the binder B. A pair of parallel spacer beams 38, extending generally in the direction of travel of the binder B, are provided having apertured end portions wherein the shafts 20 and 37 are journalled and serve to maintain the shafts 20 and 37 in a predetermined spaced parallel relation. A cross piece 39 extends transversely of the spacer beams 38 a moderate distance forwardly of the rear reel shaft 37 and is secured to both of the spacer beams 38 by suitable means. The cross piece 39 projects a moderate distance outwardly of each of the spacer beams 38 for a purpose which will be apparent from description to follow. Diagonal braces 40 are connected between the medial portion of the crosspiece 39 and portions of the respective spacer beams 38 disposed somewhat forwardly of the cross piece 39. The spacer beams 38, the cross piece 39 and the braces 40 comprise a reel frame.

Each of the shafts 20 and 37 carries a pair of sprockets 41 thereon respectively located immediately outwardly of the respective spacer beams 38. Each aligned pair of sprockets 41 carried respectively by the front and rear reel shafts 20 and 37 is provided with a sprocket chain 42 trained thereover as shown.

A series of flaps 43 spaced circumferentially of the chains 42 and extending transversely thereof are each connected at a longitudinal edge thereof to the respective chains 42 in such manner as to be swingable forwardly and rearwardly relative to the chains 42 about an axis substantially coinciding with the edge of the flap connected to the chains. The flaps 43 preferably consist of elongated rectangular pieces of somewhat flexible sheet material such as belting material formed of canvas and/or rubber or comparable material. For attachment of the flaps 43 to the chains 42, elements 43a secured to the flaps 43 are pivotally connected to apertured lugs 42a formed on links of the chain 42 corresponding in location to the desired points of attachment of the flaps 43 to the chain 42. The swingable connections of the flaps 43 to the chains 42 result in the flaps 43 at the lower runs of the chains 42 depending therefrom and the flaps at the upper side of the chains 42 lying flat thereon.

For use in connection with support of the above described reel structure, I provide a bar 44 attached to and depending from a relatively high portion of the binder frame F at the side thereof supported by the wheel 7 and secured at its lower end to a relatively low portion of the frame F so as to be rigid. A second bar 45 is secured at its rear end to a rearward portion of the frame F and slopes forwardly and somewhat downwardly therefrom. The bar 45, at its medial portion, intersects the medial portion of the bar 44 and is secured thereto at the point of intersection. The forward end of the bar 45 is apertured and disposed in alignment, transversely of the binder B, with the point at which the lower and rear end of the lower toggle bar 18 is pivotally connected to the frame F. The lower and rear end of a bar 46, of length similar to that of the lower toggle bar 18, is pivotally connected to the apertured forward end of the bar 45. An end of the forward reel shaft 20 is journalled in a suitable aperture in the forward end of the bar 46 and also in a suitable aperture in the lower end of a generally vertical bar 47 supported at its upper end from the reel supporting arm 11. The upper end of the bar 47 is bent into a hook 47a hanging over the reel supporting arm 11 and is provided with a nutted bolt 56 extending through aligned apertures therein and engaged between teeth of a rack 11b formed in the arm 11 whereby adjustment may be effected by setting the bolt in various positions on the rack 11b. From the above it should be apparent that the ends of the front reel shaft 20 are supported respectively by the bars 19 and 47, which in turn are supported from the upwardly and downwardly swingable reel supporting arms 10 and 11, and are guided by the bars 18 and 46. As previously explained, the reel supporting arms 10 and 11 may be swung upwardly and downwardly in unison by suitable manipulation of the control lever 12. It follows that the forward reel shaft 20 will be raised and lowered in response to manipulation of the lever 12.

Means is provided for supporting the rear reel shaft 37 in a manner permitting adjustive raising and lowering thereof. For this purpose a rock shaft 48, extending transversely of the binder B and located above and to the rear of the rear reel shaft 37, is journalled at its respective ends in a bearing 49 mounted on the vertical member 17 shown in Fig. 3 and in an apertured portion of a bar 50 shown in Fig. 2 as extending between and secured to the bar 44 and a rearwardly located portion of the binder B. An operating arm 51 (shown in Fig. 3) secured to and depending from the rock shaft 48 is connected through a link 52 to a control lever 13 whereby the shaft 48 may be rocked by forward and rearward movement of the lever 13. Generally forwardly extending arms 53, mounted on the rock shaft 48 near the respective ends thereof, are connected, at their free ends, through chains 54 to the respective ends of the cross piece 39 of the reel frame. It should be noted that the rear end of the reel structure is supported solely from the arms 53 through the chains 54 and hence will be raised and lowered responsive to rocking of the rock shaft 48 produced by forward and rearward movement of the lever 13.

From the above it should be apparent that the front and rear ends of my reel structure may be respectively independently raised and lowered by manipulation of the respective levers 12 and 13 whereby both the height of the reel above the ground and the tilt of the reel may be readily and easily adjusted. Ordinarily the rear portion of the reel is so adjusted in height that the flaps 43 will just clear the sickle bar S in passing thereover. The levers 12 and 13 are, of course, so located as to be easily accessible to an operator occupying the seat 55 of the binder B and are of the well known type which may be locked in any desired position thereof by means controlled by a shiftable hand piece on the lever.

The front reel shaft 20 is driven through the sprocket 14, chain 16 and sprocket 15 from rotating parts of the conventional portion of the binder B in such direction that the flaps 43 at the lower side of the reel will be propelled rearwardly toward the sickle bar S. Preferably the speed of rearward movement of the lowermost flaps 43 is somewhat greater than the speed with which the binder B is traveling over the ground. The rearwardly moving flaps force the stalks of the grain G into engagement with the sickle bar S in an obvious way whereupon the stalks are severed by the sickle knives in a well known manner.

Adjustment of the height of my reel above the ground and the tilt of the reel enables positioning of the reel to suit the nature of the ground over which the binder B is traveling. Frequent adjustment is, however, not necessary since the swingability and flexibility of the flaps 43 almost entirely precludes the possibility of damage to the reel from contact thereof with ordinary obstructions or the higher portions of undulating ground.

My reel construction has certain advantages additional to those of not requiring frequent adjustment and being substantially immune to damage from contact with obstructions. The flaps 43 at the forward portion of the reel are lowered substantially vertically between stalks of standing grain instead of being swung into the grain along a nearly horizontal portion of a large circle as occurs with the paddles of the conventional type of reel. This lessens the losses due to knocking of heads from the stalks of grain. At the rear of my reel the flaps 43 ascend substantially vertically practically immediately after passing over the sickle bar S of the binder B instead of continuing rearwardly in a gradually ascending path to propel many stalks of grain beyond the conveyor 9 of the binder B as is done by the paddles of the conventional reel.

A second form of my grain handling reel, shown in Figs. 7, 8 and 9, may be placed upon the sprockets 41 of my previously described reel supporting and driving means in substitution for the above described form of reel shown in Figs. 1, 2, 5 and 6. Accordingly, Figs. 7 and 8 show the reel shafts 20 and 37, spacer bars 38, crosspiece 39, braces 40 and sprockets 41 which were previously described.

A pair of sprocket chains 57 are mounted on the sprockets 41 in the same manner as the sprocket chains 42 previously described. At each of uniformly spaced points along the outer sides of the pair of chains 57 a pair of parallel strips or bars 58 and 59 of relatively rigid material are secured to the respective chains 57 in transverse relation to the pair of chains 57 with the bar 58 immediately adjacent the outer sides of the respective chains 57 and the bar 59 immediately outwardly of the bar 58. The bars 58 and 59 are secured to the chains 57 by suitable means such as screws 61 extending through apertures in the bars 58 and 59 into internally screw-threaded apertures in suitable links of the chains 57.

To form grain engaging flaps, a strip 60, of relatively flexible material, such as canvas or any other generally equivalent material, is provided. The flap forming strip 60 is of a width preferably approximating the length of the bars and of a length substantially exceeding the peripheral length of the chains 57. Preferably, the respective ends of the strip 60 are sewed together to form, in effect, an endless strip. The endless strip 60, thus formed, is placed in a position disposed outwardly of and parallel to the periphery of the pair of chains 57 and extending successively between the respective bars 58 and 59 of each pair thereof. With respectively equal portions of the strip 60 disposed between respective adjoining pairs of bars 58 and 59, the bar supporting screws 61 are tightened to clampingly grip portions of the strip 60 disposed between the respective bars 58 and 59 of each pair. Because of the excess lengths of the respective portions of the strip 60 between successive pairs of bars 58 and 59 relative to the distances between adjoining pairs of bars 58 and 59, such portions comprise loops. A transverse fold is made in the strip 60 at the middle of each of such loops, as at 60a, and the halves of the loop, at respective sides of the fold 60a, are transversely stitched together as at the point 60n located, with respect to each half of the loop, medially between the fold 60a and the points of support of the loop by respective pairs of bars 58 and 59. The respective halves of the loop, in the portions thereof between the stitching 60b and the fold 60a, lie flat against each other and comprise a flap 60c connected to and supported from respective adjoining pairs of bars 58 and 59 by portions 60c of the strip 60 between the stitching 60b and said respective pairs of bars 58 and 59.

Operation of the reel structure disclosed in Figs. 7, 8 and 9 is substantially the same as that of the first described form with certain exceptions to be described and brings about the advantages and superior results described in connection with the first described form.

It is to be noted that, in the lower portion of the reel between the respective front and rear sprockets 41, the space between the flap supporting portions 60c of the strip 60 and the plane of the pair of chains 57 is of triangular cross-sectional shape and that, as the pair of supporting portions 60c reach and pass over the sprockets 41, the triangular shape flattens out to substantially conform to the curvature of the sprocket peripheries and, in so doing, imparts a relatively rapid rising motion to the flap 60c.

From the above it should be apparent that I have invented a novel, improved, rugged, substantially damage-proof, light, compact, and inexpensive form of grain handling reel capable of easy and convenient operation and adjustment and conducive to far less loss of grain than the conventional form of reels.

I have constructed a full size embodiment of my invention, have put the same to considerable practical use under various conditions, and have found the same to be highly satisfactory in operation. In comparison with the conventional form of reel I have found that the loss of grain when using my reel is greatly reduced. This reduction in loss of grain is found to be greatest when the binder is being propelled at relatively high speed as when being towed by a tractor.

While my reel has been illustrated and described as embodied in a grain binder it is apparent that the same is readily adapted for use in any grain handling machine employing a reel.

It will, of course, be understood that various changes may be made in the form, details, proportions and arrangement of the parts without departing from the scope of my invention, which, generally stated, consists in a device capable of carrying out the objects above set forth, and in the novel parts and combinations of parts disclosed and defined in the appended claims.

What is claimed is:

1. A reel for a grain harvesting machine comprising at least one endless element adapted to be mounted on such a machine for movement relative thereto in an endless path disposed in a vertical plane extending substantially in the normal direction of travel of said machine, a series of grain engaging elements carried by said endless element and extending perimetrically thereof in spaced relation, each of said grain engaging elements being disposed in transversely extending, outwardly projecting relation to said endless element and being connected thereto for forward and rearward swinging movement relative thereto, and means for propelling said endless element in an endless path in such direction that the lower run of said endless element will move rearwardly of said machine.

2. A grain engaging reel for a grain cutting machine comprising an element having a periphery adapted to move in an endless path, means suitable for mounting thereof on a grain cutting machine and adapted for supporting said element in a manner permitting movement of said periphery in an endless path one portion of which extends substantially in the line of travel of said machine, means for moving said element so that the part of the periphery thereof traveling said portion of said path will move rearwardly relative to said machine, and a series of grain engaging flaps disposed laterally of said element and connected to spaced points on the periphery thereof for swinging movement relative to said element about axes disposed laterally of said element.

3. A grain engaging reel for a grain cutting machine comprising an endless flexible element, guide means suited for mounting thereof on a grain cutting machine and adapted for supporting said element and guiding the same in movement through a path having a portion extending generally in the line of travel of said machine, means for moving said flexible element through said path with the portion of the element in said portion of the path moving rearwardly relative to said machine, and a series of flaps connected at spaced respective points to the outer side of said flexible element for swinging movement relative thereto about axes disposed transversely thereof.

4. A grain engaging reel for a grain cutting agricultural machine comprising a group of similar, spaced, parallel, endless, flexible elements, guide means suited for mounting thereof on a grain cutting machine and adapted for supporting said group and guiding the same in movement through an endless path having a portion extending generally in the line of travel of said machine, means for moving said elements through said path with the portion of said group in said portion of its path moving rearwardly relative to said machine, and a series of flaps disposed transversely of said group and connected at spaced points to the outer sides of the respective elements of said group for swinging movement relative to said group about an axis extending transversely of the same.

5. A grain engaging reel for a grain cutting agricultural machine comprising a group of similar, spaced, parallel, endless flexible elements, guide means suited for mounting thereof on a grain cutting machine and adapted for supporting said group and guiding the same in movement through an endless path having a portion extending generally in the line of travel of said machine, means for moving said group through said path with the portion of said group in said portion of its path moving rearwardly relative to said machine, and a series of rectangular grain-engaging flaps disposed transversely of said group and connected along a longitudinal edge of each to respective spaced points on the outer side of said group for swinging movement relative to said group about an axis extending transversely of said group.

6. A grain engaging reel for a grain cutting agricultural machine comprising a group of similar, spaced, parallel, endless, flexible elements, guide means suited for mounting thereof on a grain cutting machine and adapted for supporting said group and guiding the same in movement through an endless path having upper and lower portions extending generally in the line of travel of said machine, means for so moving said group that the part thereof in the lower portion of said path will move rearwardly relative to said machine, and a series of rectangular grain-engaging flaps disposed transversely of said group and so connected to spaced points on the outer periphery of said group as to depend from the lower run of said group and be swingable forwardly and rearwardly relative to said group.

7. A grain engaging reel for a grain cutting machine comprising revoluble elements adapted to be mounted on a grain cutting machine for rotation on axes disposed transversely of said machine and located one forwardly of the other, an endless flexible element trained over said revoluble elements to include respective upper and lower runs, means for rotating one of said revoluble elements whereby the lower run of said endless element will move rearwardly relative to said machine, and a series of grain engaging flaps disposed transversely of said machine and so connected to the outer side of said endless element at respective spaced points thereon as to be swingable about axes disposed transversely of said machine.

8. The structure defined in claim 7 and means for adjustively raising and lowering the forwardmost one of said revoluble elements independently of the rearmost one thereof.

9. The structure defined in claim 7 and means for adjustively raising and lowering the rearmost one of said revoluble elements independently of the forwardmost one thereof.

10. The structure defined in claim 7 and means for adjustively raising and lowering each of said revoluble elements independently of the other.

11. A grain engaging reel for a grain cutting agricultural machine comprising a group of similar, spaced, parallel, endless, flexible elements, guide means suited for mounting thereof on a grain cutting machine and adapted for supporting said group and guiding the same in movement through an endless path having a portion extending generally in the line of travel of said machine, means for moving said element through said path with the portion of said group in said portion of its path moving rearwardly relative to said machine, a series of flaps disposed transversely of said group, and a pair of relatively flexible connecting elements connecting a longitudinal edge of each flap to respective peripherally spaced portions of said group.

12. A grain engaging reel for a grain cutting agricultural machine comprising at least a pair of similar, spaced, parallel, flexible, endless elements, guide means suited for mounting thereof on a grain cutting machine and adapted for supporting said pair and guiding the same in movement through an endless path having a portion extending generally in the line of travel of said machine, means for moving said pair through said path with the portion of said pair in said portion of its path moving rearwardly relative to said machine, a series of relatively flexible flap elements disposed transversely of and at the outer side of said pair and spaced apart peripherally of said pair in outwardly projecting relation thereto, the flap elements of each successive pair thereof being joined to each other outwardly of said endless elements along a line extending transversely of said pair of endless elements.

13. A grain engaging reel for a grain cutting machine comprising an element having a periphery adapted to move in an endless path, means suitable for mounting thereof on a grain cutting machine and adapted for supporting said element in a manner permitting movement of said periphery in an endless path one portion of which extends substantially in the line of travel of said machine, means for moving said element so that the part of the periphery thereof travelling in said portion of said path will move rearwardly relative to said machine, and a series of relatively flexible grain engaging flaps disposed laterally of said element and connected to spaced points on the periphery thereof.

14. A grain engaging reel for a grain cutting machine comprising an element having a periphery adapted to move in an endless path, means suitable for mounting thereof on a grain cutting machine and adapted for supporting said element in a manner permitting movement of said periphery in an endless path one portion of which extends substantially in the line of travel of said machine, means for moving said element so that the part of the periphery thereof travelling in said portion of said path will move rearwardly relative to said machine, and a series of relatively flexible grain engaging flaps disposed laterally of said element and connected to spaced points on the periphery thereof for swinging movement relative to said element about respective axes disposed laterally of said element.

LEO ROSENVOLD.